(Model.)
O. W. SWIFT.
APPARATUS FOR COOLING AND PURIFYING LIQUIDS.
No. 605,685. Patented June 14, 1898.
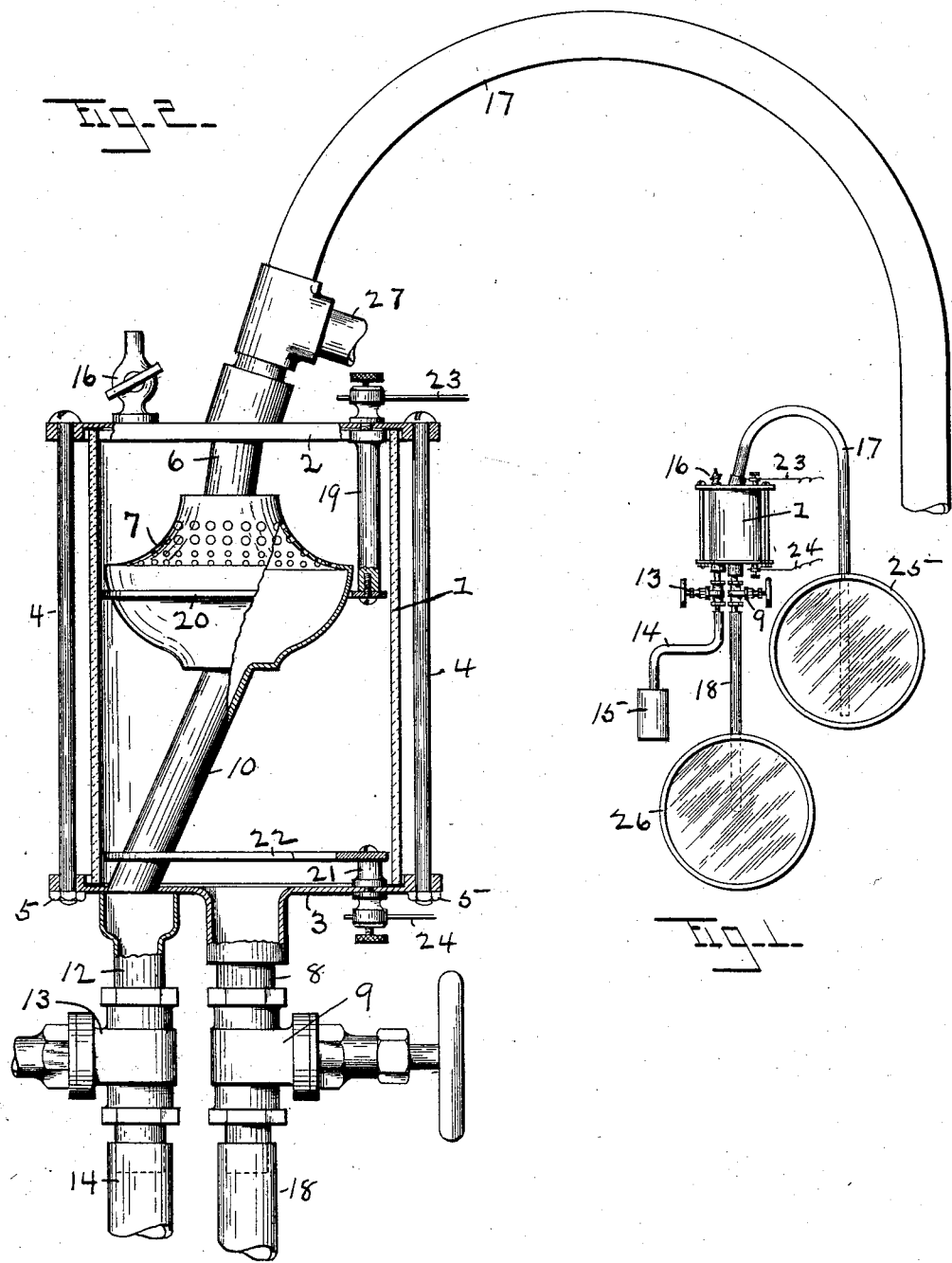
Witnesses.
J. P. Dijon
J. J. Hogan
Inventor.
Orrin W. Swift
By Chapman & Hall
Attorneys.

UNITED STATES PATENT OFFICE.

ORRIN W. SWIFT, OF NEW HAVEN, CONNECTICUT.

APPARATUS FOR COOLING AND PURIFYING LIQUIDS.

SPECIFICATION forming part of Letters Patent No. 605,685, dated June 14, 1898.

Application filed July 16, 1897. Serial No. 644,762. (Model.)

*To all whom it may concern:*

Be it known that I, ORRIN W. SWIFT, a citizen of the United States, residing at New Haven, in the county of New Haven and State of Connecticut, have invented certain new and useful Improvements in Apparatus for Cooling and Purifying Liquids; and I do hereby declare the following to be a full, clear, and exact description of the invention, such as will enable others skilled in the art to which it appertains to make and use the same.

My invention relates to apparatus for cooling and purifying liquids; and it has for its object to provide a simple and comparatively inexpensive form of apparatus by which liquids can be transferred from one receptacle to another and during such transit reduced to an atomized or spray form, whereby any heat in the liquid—as, for example, the animal heat in milk—is eliminated.

A further object is to provide such apparatus with means whereby the liquid while in atomized or spray form is subjected to the action of a current of electricity, thereby eliminating therefrom many impurities and aging the liquid.

To these ends my invention consists in the apparatus constructed and operating as hereinafter fully described.

Referring to the drawings, in which like numerals designate like parts in both views, Figure 1 is a side view of the apparatus as applied in transferring liquid from one barrel to another and at the same time purifying the same. Fig. 2 is a vertical section of the apparatus drawn to a larger scale.

In the practice of my invention I employ a chamber through which the liquid is caused to pass and within which it is reduced to an atomized or spray form, and I have herein shown such chamber as being of cylindrical form, its body 1 being preferably composed of glass to enable the action of the liquid therein to be seen. The upper head 2 and lower head 3 of said chamber are joined to said body by suitable interposed packing, as shown in Fig. 2, to render the chamber airtight and are held in such position by the bolts 4 and nuts 5. Through the upper head 2 of the chamber leads the inlet-pipe 6, which pipe terminates at its lower end within and at the upper end of the chamber in the spraying-head or atomizer 7, consisting of a cup-shaped body having its upper side pierced with small holes, through which the liquid is caused to issue in a series of fine jets or sprays, passing in such form to the bottom of the chamber. Through the lower head 3 of the chamber passes the outlet-pipe 8, which contains a suitable valve 9. A waste-pipe 10 leads from the bottom of the atomizer 7 through the lower head 3 and communicates with a pipe 12, containing a valve 13, and a pipe 14 connects said pipe 12 with a suitable closed vessel 15, which receives the sediment and heavier impurities removed from the liquid, as will be presently described. The upper head 2 of the chamber is provided with the petcock 16, through which air can be exhausted from the chamber and through which the vapor and gases freed from the liquid are permitted to escape. A pipe 17 joins the inlet-pipe 6 by a bend, as shown, and forms the short leg of a siphon, and a pipe 18, forming a continuation of the outlet-pipe 8, together with the atomizing-chamber, forms the long leg of such siphon.

The apparatus as thus far described is adapted to be used for cooling and purifying liquids, and its operation is as follows: The pipe 17 being inserted within the vessel containing the liquid and the pipe 18 within the empty vessel and valves 9 and 13 being closed, the air is exhausted from chamber 1 through the petcock 16, thereby causing the liquid to flow through pipes 17 and 6 to the atomizer 7 and thence upwardly through the jet-openings in the latter, in the form of a series of fine jets or sprays, to the chamber, filling the latter. Valves 9 and 13 are then opened and the liquid begins to flow through pipes 8 and 18 to the receiving vessel, such flow being continuous by the siphonic action until all of the liquid has been transferred from the full to the empty vessel. After opening said valves 9 and 13, as just described, sufficient air is admitted to the chamber 1 through petcock 16 to depress the level of the body of liquid within said chamber to any desired point between the atomizer and the bottom of the chamber, preferably to a point substantially one-fourth the height of the chamber above said bottom, and the liquid during the remainder of the operation falls from the atomizer to the liquid-level in the chamber in jet or spray form, the air-pressure keeping said level constant without interrupting the siphonic action. At the same time a portion of the liquid passes through waste-pipe 10 and pipes 12 and 14 to the closed vessel 15 and fills the latter. The action of the atomizer upon the liquid quickly cools the latter, while the heavier portions of any impurities which it may contain fall by gravity to the bottom of the atomizer and pass thence through the still body of liquid in pipes 10, 12, and 14 to the vessel 15, from which they may be readily removed at the close of the operation.

While the apparatus, operating as thus described, is of great importance for quickly cooling and purifying such liquids as milk, for example, I have found that its range of usefulness can be greatly increased by providing means for subjecting the liquid while in atomized form within the chamber to the action of a current of electricity, whereby certain deleterious ingredients of various kinds of liquids—as, for example, the fusel-oil in alcohol liquids—are to a very large extent eliminated therefrom, and the process of aging the liquor is very greatly expedited. As one of the various forms of means for securing this result which can be employed I have herein shown a binding-post 19, extending through the upper head 2 of chamber 1, but insulated therefrom, said post carrying at its lower end a flat ring 20 of any suitable metal forming a good conductor of electricity, which encircles the atomizer 7 below the plane of the jet-openings in the latter, and a similar insulated binding-post 21, extending through the lower head 3 and carrying at its upper end, near the bottom of the chamber, a similar flat ring 22. A wire 23 connects binding-post 19 with one pole of a generator, and a wire 24 connects binding-post 21 with the opposite pole of said generator. A normally open circuit is thus established, which circuit is closed by the body of liquid at the bottom of the chamber and the descending column of liquid, in jet or spray form, extending from the level of said body to the contact-ring 20, thus thoroughly subjecting all of the liquid to the action of the electric current.

In the use of the apparatus for thus purifying and aging liquors the short leg of the siphon is inserted in a barrel 25 or other vessel containing the liquor, and the long leg thereof is inserted in the empty barrel 26, and the liquor is transferred to the latter by siphonic action, as before described. In its passage through the chamber 1 the liquor is atomized and mechanically purified, as previously described, and, in addition, is electrically purified and aged by the action of the electric current, the gases thus released being permitted to escape from time to time through the petcock 16.

In order to adapt the apparatus for use in blending or mixing two different liquids simultaneously with the purifying operation, I have shown in Fig. 2 a bench-pipe 27, communicating with the inlet-pipe 6, which branch pipe may lead from any suitable source of supply for the second liquid, and thus materially increase the useful capacity of the apparatus.

It has been found by actual demonstration that by the use of the apparatus herein shown and described alcoholic liquors can be quickly purified and aged without reducing to any appreciable extent their percentage of alcohol, thus obviating what has heretofore been a long and expensive operation.

Having thus fully described my invention, what I claim as new, and desire to secure by Letters Patent, is—

1. In an apparatus for the purpose specified, the combination with a chamber having means whereby air can be exhausted therefrom and having an outlet-pipe leading therefrom, of a hollow head located within said chamber near the top thereof and provided with a series of jet or spray openings, an inlet-pipe leading to said head, a contact device located adjacent to said head and adapted to be engaged by a liquid issuing from the latter, a second contact device located near the bottom of said chamber, and means for connecting said contact devices respectively with the opposite poles of a generator of electricity, said inlet-pipe forming the short leg and said chamber and its outlet-pipe the long leg of a siphon, substantially as set forth.

2. In an apparatus for the purpose specified, the combination with a closed chamber having means whereby air can be exhausted therefrom and admitted thereto, of an outlet-pipe leading from the bottom of said chamber and provided with a valve, a spray-head located within said chamber near the top thereof, an inlet-pipe leading to the interior of said spray-head, said inlet-pipe forming the short leg and said chamber and outlet-pipe forming the long leg of a siphon, and means for subjecting a liquid, in its descent from said spray-head to the bottom of the chamber, to the action of a current of electricity, substantially as set forth.

3. In an apparatus for the purpose specified, the combination with a closed chamber provided with a valve through which the air can be exhausted therefrom, an outlet-pipe leading from the bottom of said chamber and provided with a valve, a hollow head located within said chamber and having in its upper side a series of jet or spray openings, a sediment-pipe leading from the bottom of said head through the wall of said chamber and provided with a valve, a bent inlet-pipe leading to said hollow head and forming the short leg of a siphon, two contact-rings located within said chamber between said hollow head and the bottom of the latter, and means for connecting said rings respectively with the opposite poles of a generator of electricity, substantially as described.

4. The combination with a chamber, as 1, of an atomizer, as 7, located within said chamber near the top thereof, an outlet-pipe leading from the bottom of the chamber, an inlet-pipe leading to said atomizer, the insulated binding-post 19 passing through the upper head of the chamber and carrying at its lower end a contact device, as the ring 20, and the insulated binding-post 21 passing through the lower head of said chamber and carrying at its upper end a contact device, as the ring 22, said inlet-pipe forming the short leg and said chamber and its outlet-pipe forming the long leg of a siphon, substantially as and for the purpose described.

In testimony whereof I affix my signature in presence of two witnesses.

ORRIN W. SWIFT.

Witnesses:
WM. H. CHAPMAN,
J. P. DEJON.